United States Patent
Walley et al.

(10) Patent No.: US 9,104,238 B2
(45) Date of Patent: Aug. 11, 2015

(54) SYSTEMS AND METHODS FOR PROVIDING ENHANCED MOTION DETECTION

(75) Inventors: John Walley, Ladera Ranch, CA (US); Shawn Johnson, Rancho Santa Margarita, CA (US); Christopher Pasqualino, Glendora, CA (US); Ike Ikizyan, Newport Coast, CA (US); Xuemin Chen, Rancho Santa Fe, CA (US)

(73) Assignee: BROADCOM CORPORATION, Irvine, CA (US)

( * ) Notice: Subject to any disclaimer, the term of this patent is extended or adjusted under 35 U.S.C. 154(b) by 833 days.

(21) Appl. No.: 13/023,298

(22) Filed: Feb. 8, 2011

(65) Prior Publication Data

US 2011/0199304 A1    Aug. 18, 2011

Related U.S. Application Data

(60) Provisional application No. 61/337,932, filed on Feb. 12, 2010.

(51) Int. Cl.
| | |
|---|---|
| G06F 3/033 | (2013.01) |
| G06F 3/01 | (2006.01) |
| G06F 3/03 | (2006.01) |
| G06F 3/0346 | (2013.01) |
| G06F 3/038 | (2013.01) |

(52) U.S. Cl.
CPC .............. *G06F 3/017* (2013.01); *G06F 3/0304* (2013.01); *G06F 3/038* (2013.01); *G06F 3/0346* (2013.01)

(58) Field of Classification Search
CPC ..... G06F 3/017; G06F 3/0304; G06F 3/0346; G06F 3/038
USPC .................................. 345/156–169; 715/856
See application file for complete search history.

(56) References Cited

U.S. PATENT DOCUMENTS

| | | | | |
|---|---|---|---|---|
| 5,526,024 | A * | 6/1996 | Gaglianello et al. | 345/547 |
| 6,664,531 | B2 * | 12/2003 | Gartner et al. | 250/208.1 |
| 7,256,797 | B2 * | 8/2007 | Yoshida | 345/619 |
| 7,970,966 | B1 * | 6/2011 | Hobbs | 710/72 |
| 2003/0189548 | A1 * | 10/2003 | Rovati et al. | 345/163 |
| 2004/0113890 | A1 * | 6/2004 | Ranta | 345/166 |
| 2007/0019771 | A1 * | 1/2007 | Ambuehl et al. | 375/372 |
| 2008/0288992 | A1 * | 11/2008 | Usman et al. | 725/105 |
| 2010/0060573 | A1 * | 3/2010 | Moussavi | 345/158 |
| 2010/0067746 | A1 * | 3/2010 | Liu et al. | 382/107 |
| 2011/0124410 | A1 * | 5/2011 | Mao et al. | 463/31 |

FOREIGN PATENT DOCUMENTS

| | | | |
|---|---|---|---|
| KR | 10200900079019 | * | 7/2009 |
| WO | WO 2007124613 A | * | 11/2007 |

* cited by examiner

*Primary Examiner* — Amare Mengistu
*Assistant Examiner* — Stacy Khoo
(74) *Attorney, Agent, or Firm* — Oblon, McClelland, Maier & Neustadt, L.L.P.

(57) ABSTRACT

Provided are systems and methods for providing enhanced motion detection. One system providing enhanced motion detection includes a smart display, an interface subsystem including a human interface device (HID), and a console having a processor configured to form communication links with the smart display and the interface subsystem and to provide motion detection feedback, using the smart display, to a user of the HID, where the HID is configured to sense motion of the HID and utilize a predictive model to characterize the motion of the HID. One interface subsystem includes a camera to sense motion of a user of the HID. One processor is configured to negotiate a reduced response latency with the smart display.

24 Claims, 3 Drawing Sheets

SYSTEMS AND METHODS FOR PROVIDING ENHANCED MOTION DETECTION

RELATED APPLICATIONS

This application is based on and claims priority from U.S. Provisional Patent Application Ser. No. 61/337,932 filed on Feb. 12, 2010, which is hereby incorporated by reference in its entirety.

BACKGROUND OF THE INVENTION

1. Field of the Invention

The present invention relates generally to electronic devices and systems. More particularly, the present invention relates to mediating user inputs to interactive electronic devices and systems.

2. Background Art

Interactive media relies heavily on being able to immerse a customer or user in a particular environment for extended periods of time. In particular, interactive applications for personal computers and game consoles typically incorporate some kind of device that allows a user to use mechanical motion of part or all of their body to create a desired response in the interactive application being executed by the computer or console. That desired response is typically provided as visual feedback to the user through use of a display, such as a television. By successfully tying the desired response and the visual feedback to the mechanical motion of the users body, the application attempts to provide a reasonably immersive interactive experience.

Unfortunately, that visual feedback is often disjoint from the mechanical motion used to create the associated desired response, resulting in either an unintended response in the interactive application, or in an exceedingly frustrating and non-immersive interactive experience for the user.

For example, many contemporary devices used to detect mechanical motion of a user are connected to consoles wirelessly, but their utility is foreshortened due to poor battery life, which can abruptly and frustratingly interrupt an interactive experience. Even if a device used to detect motion is powered directly from a console, however, many such devices detect motion inaccurately, or are difficult to manipulate accurately or seamlessly with natural motion of a user.

Moreover, compounding the unsatisfactory interactive experience is a tendency of contemporary displays to incorporate long video latencies associated with noise reduction and other video quality-enhancing computational features. While such video quality features typically do not negatively affect normal television viewing, where audio and video can be synchronized regardless of any arbitrary delay between the television being presented with video data and the video data being displayed, the video latencies associated with such features can add 200 milliseconds or more to an overall response latency, which can significantly reduce responsiveness and realism of an interactive media experience, particularly where hand-eye coordination is required.

Accordingly, there is a need to overcome the drawbacks and deficiencies in the art by providing an enhanced motion detection methodology that provides increased accuracy and a more realistic feedback experience while reducing power usage requirements.

SUMMARY OF THE INVENTION

The present application is directed to systems and methods for providing enhanced motion detection, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to systems and methods for providing enhanced motion detection. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art.

The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1A:
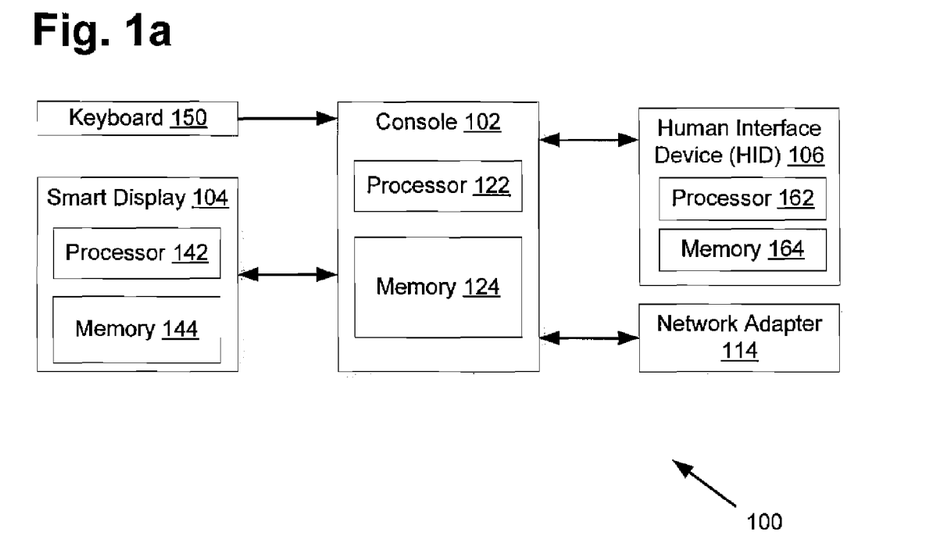
FIG. 1a presents a diagram of a system for providing enhanced motion detection according to one embodiment of the present invention.
Figure 1B:
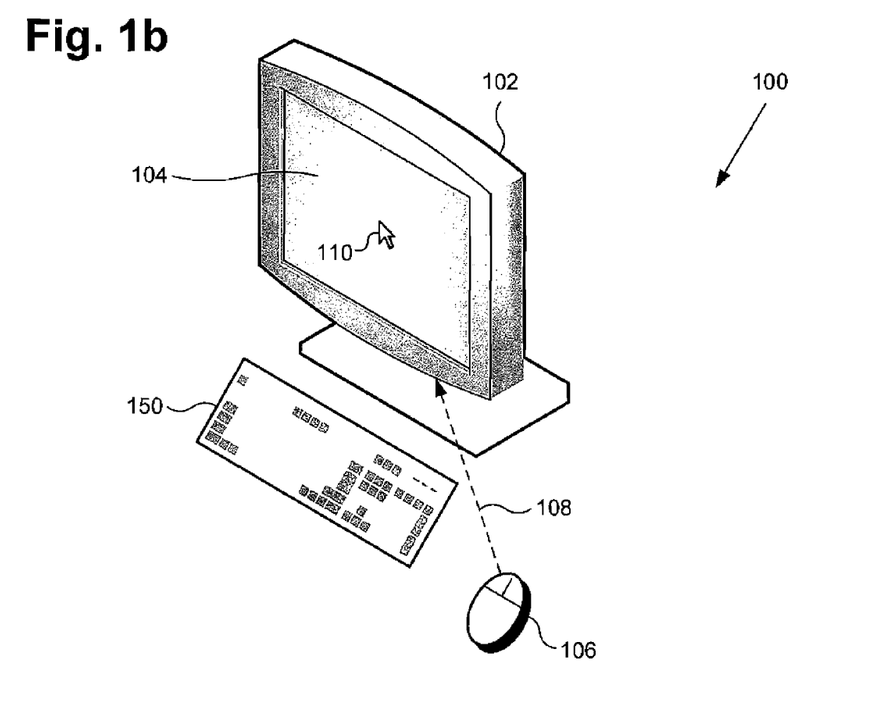
FIG. 1b presents an illustration of the system in FIG. 1a, according to one embodiment of the present invention.

FIGS. 1a and 1b show an interactive environment configured for enhanced motion detection of a human interface device (HID), according to one embodiment of the present inventive concepts. Interactive environment 100 includes console 102, keyboard 150, and HID/computer mouse 106. Console 102 may be any computing device, for example, such as a mobile or desktop computer, game console, modern cell phone or tablet device. As shown in FIG. 1a, console 102 may comprise processor 122 and/or memory 124, which may be configured to form communication links with smart display 104 and mouse 106, for example, and to execute interactive applications for display on, for example, smart display 104. Smart display 104 may comprise any display technology capable of displaying output data, such as output video data, for example, from console 102, thus providing visual motion detection feedback for a user (not shown in FIGS. 1a and 1b) in interactive environment 100. Smart display 104 may also include processor 142 and/or memory 144, for example, which may be configured to support a communication link with console 102, for example, and transfer data corresponding to state information and/or operating parameters of console 102, smart display 104, or both. Although FIG. 1a shows smart display 104 separate from console 102, it should be understood that smart display 104 may be integrated with console 102, as is shown in FIG. 1b. Moreover, although smart display 102 in FIG. 1a is shown as a single device in FIG. 1a, smart display 104 may alternatively comprise a generic display controlled by a smart remote control, for example, where the smart remote control may be configured to form a communication link with console 102, for example. Under such circumstances, such a smart remote control may act as an intermediary between a generic display and console 102, for example, facilitating transfer of data corresponding to state information and/or operating parameters.

Also shown in FIG. 1a, HID/computer mouse 106 may form a portion of an interface subsystem, for example, and may comprise any device capable of supporting a communication link with console 102, for example, and capable of sensing its own motion, for example, through use of one or more sensors, such as integrated gyroscopic sensors, optical sensors, electromagnetic sensors, mechanical sensors, and the like. HID/computer mouse 106 may also include processor 162 and memory 164, for example, which may be configured to execute a predictive model for sensed motion, as is described more fully below, and selectively transmit data corresponding to sensed motion to console 102, for example. Keyboard 150 may also form a portion of an interface subsystem, for example, and may be used to supplement transmissions from HID/computer mouse 106, for example, in order to facilitate interaction of a user (not shown in FIGS. 1a and 1b) with an application executed by console 102.

As shown in FIG. 1b, computer mouse 106 is coupled to console 102 through communication link 108, which may be a wired or wireless link, for example, and may be mediated through a network adapter, such as network adapter 114 in FIG. 1a. Computer mouse 106 may be manipulated by a user (not shown in FIG. 1b) to control the location of cursor 110 on smart display 104, for example, and provide inputs to console 102. Thus, motion and position of cursor 110 on smart display 104 provides motion detection feedback to a user of computer mouse 106. It is noted that although FIG. 1b depicts the present inventive concepts in terms of user inputs to console 102 made by means of computer mouse 106, more generally those concepts apply to any interactive system including a host system, such as console 102, receiving user inputs from an interface subsystem including any number of HIDs, such as computer mouse 106, wherein the user inputs include data describing the position and/or motion of any of the HIDs. Consequently, although the embodiment of FIG. 1b shows localized interactive environment 100, in other embodiments, the interface subsystem, it's components, and the host system may be distributed across a network, for example, and be physically remote from one another.

Referring to interactive environment 100, a conventional approach to detecting the inputs from computer mouse 106 typically includes tracking the lateral motion of computer mouse 106 over a flat surface, such as a mouse pad. Changes in the position of computer mouse 106 may be precisely measured and correlated to respective locations on the display of console 102. A user is thereby enabled to navigate across the display and select or deselect displayed images, for example, using computer mouse 106.

This conventional approach is fundamentally inefficient, and can be substantially improved upon by an approach that inverts the conventional strategy for detecting motion. For example, in contrast to the conventional premise that no information exists about a movement of computer mouse 106 before it occurs, some information does indeed exist, and may be used to reduce the amount of transmitted data necessary to accurately track a movement of computer mouse 106. In other words, there are typically only a finite number of motions that computer mouse 106 will experience in the context of being utilized by a human user to interact with console 102, and those movements can be reliably predicted on the basis of such factors as usage characteristics and the initial speed and direction of a movement, for example.

Usage characteristics may include constraints such as the operative facts that computer mouse 106 will be manipulated by the hand of a human user, will move on a substantially flat surface and within a relatively small area of that surface, and/or will be used to navigate a content space corresponding to the display of console 102. Usage characteristics may also include constraints arising from a particular application in use with console 102, for example, such as a word processing application, or a computer game. An initial speed and direction of movement, considered in combination with the usage characteristics, can enable approximations of likely trajectories and motion endpoints for computer mouse 106. Consequently, the described usage characteristics, and/or others, can be utilized to determine a predictive model of possible movements of computer mouse 106, as well as their interrelatedness, e.g., the likelihood of a first movement to either indicate or preclude a subsequent movement. For instance, in the relatively simple case of movement of computer mouse 106, a second or third order polynomial equation may be sufficient to characterize the motion of computer mouse 106. In that way, a predictive model of possible movements and movement combinations can be produced for computer mouse 106.

According to one embodiment of the present novel concepts, such a model is determined and stored as a reference in both computer mouse 106 and console 102. Data corresponding to an initial increment of a movement by computer mouse 106 can then be recorded by computer mouse 106, and may also be transmitted to and recorded by console 102. The model of possible movements stored on console 102 and computer mouse 106 can then be used to evaluate that initial movement data, and subsequent motion of computer mouse 106 can be predicted. At that juncture, subsequent movements of computer mouse 106 are known until a movement of computer mouse 106 substantially deviates from the predictive model. At that point, data corresponding to the deviations may be transmitted to console 102 across communication link 108, and a new prediction of subsequent movements results. As such, console 102 may use the predictive model and the deviations to provide motion detection feedback to a user by, for example, adjusting motion and position of cursor 110 on smart display 104. In some embodiments, either or both console 102 and computer mouse 106 may determine that certain usage characteristics have changed, for example, and determine a new predictive model or determine adjusted model parameters for further motion detection.

Thus, by modeling the possible movements of an HID, receiving data corresponding to an initial movement of the HID, and receiving subsequent movement data only when movements of the HID substantially deviate from the modeled movements, the present novel and inventive approach effectively compresses the data required for motion detection, which significantly reduces utilization of a communication link between an HID and a host system, such as communication link 108 between computer mouse 106 and console 102. At its most efficient, e.g., where movement follows only predicted trajectories, the present approach enables motion detection based on little more than initial movement data. Moreover, at its least efficient, e.g., consecutive movements deviating significantly from predicted trajectories, the present approach, by requiring only transmission of deviation data, is still likely to require less data to accurately perform motion detection than conventional approaches that affirmatively track and transmit each movement of the HID. In some embodiments, the present approach may be used to compensate for intermittent loss of communication between an HID and a host, for example, by providing a type of packet loss concealment, for example, where a predictive model may act to smooth over, interpolate around, or otherwise conceal loss of data corresponding to sensed motion of an HID.

Although the above methodology is presented in the context of sensing and transmitting motion detection data corresponding to motion of an HID stimulated by a user, in other embodiments, the same methodology may be used in the context of sensing and transmitting motion detection data corresponding to motion of a user separate from motion of an HID stimulated by a user.

For example, in another embodiment, an interface subsystem of an interactive environment similar to interactive environment 100 shown in FIG. 1b may include a camera configured to sense position and/or motion of a user, as is explained more fully below. As with movements of an HID, such as computer mouse 106 described above, there are typically only a finite number of detectable movements that a user will experience in the context of being a human user interacting with console 102, for example, and those movements can be reliably predicted on the basis of such factors as usage characteristics and the initial speed and direction of a movement, for example. In such context, usage characteristics may include, in addition to the characteristics noted above, the sensing capability of a particular camera, for example, such as only being able to sense a silhouette of a user. An initial speed and direction of movement, considered in combination with the usage characteristics, can enable approximations of likely trajectories and motion endpoints for a sensed user. Consequently, the described usage characteristics, and/or others, can be utilized to determine a predictive model of possible movements of a user, as well as their interrelatedness, e.g., the likelihood of a first movement to either indicate or preclude a subsequent movement. For instance, as described above with respect to computer mouse 106, a second or third order polynomial equation may be sufficient to characterize motion of a user relevant to a particular application in use with console 102. In that way, a predictive model of possible movements and movement combinations can be produced for a camera, and used to reduce utilization of a communication link between, for example, a remotely placed camera and console 102.

As an example, in one embodiment, an interface subsystem of interactive environment 100 may include computer mouse 106, as shown in FIG. 1b, as well as a camera (not shown in FIG. 1b) placed above smart display 104 and in communication with console 102 over a separate communication link (not shown in FIG. 1b). Console 102 may be executing an image processing application, for example, and the camera may be configured to detect motion of a face of a user such that placing a face closer to the camera causes a displayed image to expand to show more localized detail, and placing a face further from the camera causes a displayed image to contract to show the full image. As above, computer mouse 106 may control motion and position of cursor 110 on smart display 104, and may utilize an appropriate predictive model as outlined above. Based on the types of motions of a human face expected when performing image processing, for example, and since only distance to a face is required for the particular application, with respect to sensing performed by the camera, console 102 may determine a first or second order polynomial equation predictive model is sufficient to characterize the motion detected by the camera, and then the determined predictive model may be stored in the camera and console 102. From that point, the methodology may progress as described above with respect to detected motion of computer mouse 106, where motion detection feedback for both the camera and computer mouse 106 is provided to the user by smart display 102. Thus, the present novel and inventive approach effectively compresses the image data required for motion detection by the camera, since, in this embodiment, the camera only transmits distance data and deviations from the predictive model. This approach, inclusive with motion detection by computer mouse 106, significantly reduces utilization of the communication links between the interface subsystem and the host system; e.g., the communication links between computer mouse 106, the camera, and console 102.

It should be noted, however, that console 102 may subsequently determine that a chosen predictive model for motion detection of an HID or a user is less than ideal, due to persistent re-initialization of the model, for example. For instance, a user may switch from one application involving fast but simple motions that may be modeled using a simple linear model, for example, to another application involving more complex and/or slower motion requiring a more accurate model. Under such circumstances, console 102 may determine a new predictive model, or new parameters for a predictive model presently in use, for example, is better suited for the particular circumstances causing the re-initializations, and then replace the old predictive model with the new or different predictive model automatically, thus dynamically reducing utilization of communication links throughout the interface subsystem. A particular predictive model may be determined based on usage characteristics, as explained above, and may be provided by a particular application or update to an application, and may be determined through an iterative statistical method, such as a method comprising a genetic algorithm approach, for example. In other embodiments, a predictive model may be created through cumulative training of an initial predictive model, for example, that is tied to a particular user. Such cumulative training may involve long term storage of model parameters, motion data, deviation data, and the like, and analysis of the same, and such data and/or analysis may be shared between an HID and a console over any communication link, for example.

By being able to reduce utilization of communication links in an interface subsystem, embodiments of the present invention decrease power usage requirements for interface subsystem components, such as a camera, or HIDs like computer mouse 106, for example. This reduction in power usage allows interface subsystem components to have increased battery lifetimes, for example, which advantageously increases an immersive and/or productive experience of interactive environments, such as interactive environment 106, by prolonging a time between charges, for example. In addition, or alternatively, the reduction in power usage may allow for a concomitant reduction in the size and weight of batteries used, which may beneficially allow interface subsystem components to be manufactured smaller and lighter, facilitating more comfortable use or easier manipulation or mounting by a user. As such, an electronic system including interface subsystem components according to the present inventive concepts may provide a more accurate and more realistic feedback experience to a user by integrating seamlessly with a user's own motion or that user's manipulation of an HID.

Figure 2:
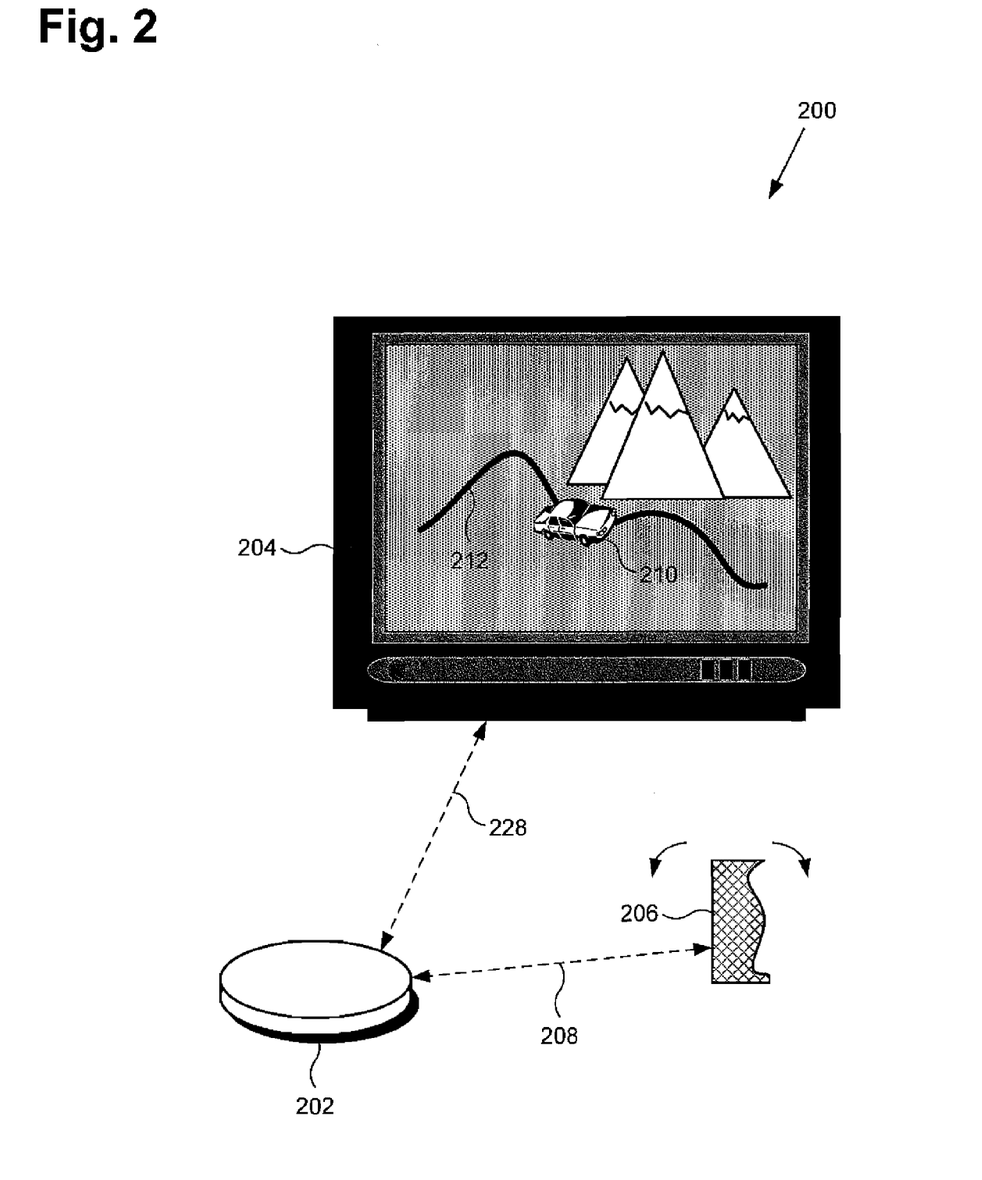
FIG. 2 presents an illustration of a system and method for providing enhanced motion detection according to one embodiment of the present invention.

Moving to FIG. 2, FIG. 2 shows an interactive environment configured for enhanced motion detection that reduces response latency, according to one embodiment of the present inventive concepts. Interactive environment 200 includes smart display 204 connected to game console 202 over communication link 228, and input joystick 206 connected to game console 202 over communication link 208. Game console 202, smart display 204, joystick 206 and communication link 208 of FIG. 2 correspond respectively to console 102, smart display 104, mouse 106 and communication link 108 of FIG. 1; e.g., each corresponding structure may be configured to exhibit the same features and/or operate substantially the same as its counterpart. For example, joystick 206 may be one of many HIDs forming an interface subsystem that is in communication with game console 202 over wired and/or wireless communication links such as communication link 208. As with smart display 104 in FIGS. 1a and 1b, smart display 204 may comprise any display capable of forming a communication link with game console 202, for example, which may include a display coupled with a smart remote control (not shown in FIG. 2) that may itself be capable of forming a communication link with game console 202, thus facilitating transfer of data corresponding to state information and/or operating parameters and display of output data such as output video data, from game console 202.

Also shown in FIG. 2, communication link 228 may be a wired link, such as a high-definition multimedia interface (HDMI) connection, for example, or a wireless link, or any combination of wired and/or wireless communication links capable of transmitting data, including video data, between game console 202 and smart display 204. As further shown in FIG. 2, joystick 206 can be manipulated by a user (not shown in FIG. 2) to control the location and direction of vehicle graphic 210 on racing track 212 displayed by smart display 204.

It is noted that although FIG. 2 depicts the present inventive concepts in terms of user inputs to game console 202 made by means of joystick 206 and displayed by smart display 204 for motion detection feedback to a user of joystick 206, more generally these concepts apply to any interactive system including a console and a video display receiving control inputs from an interface subsystem, wherein the control inputs include data describing the position and/or motion of the interface subsystem or, for example, a user of the interface subsystem. Consequently, although the embodiment of FIG. 2 shows localized interactive environment 200, in other embodiments, the interface subsystem providing the input data, the console, and the display may each be distributed across a network, for example, and be physically remote from one another.

Response latency is a significant and growing problem, particularly with gaming systems using modern digital televisions (TVs) as displays. Referring by example to FIG. 2, assume that smart display 204 comprises a modern digital TV, such as a high-definition (HD) capable TV, and is being used as a gaming display for a video game executed by game console 202 that is receiving user inputs from joystick 206. As a practical matter, there is a response delay, or response latency, from the time a user stimulates joystick 206 to the time an action corresponding to the input stimulus appears on smart display 204 as feedback to the user. In order for the gaming experience to be perceived by a user as having real-time responsiveness, that response latency should typically be less than approximately 100 ms, with 50 ms round trip delay being close to ideal.

However, the latency associated with displaying video on modern digital TVs has been increasing with the additional layers of digital signal processing (DSP) used with newer display technologies. For example, video latency for older model cathode ray tube (CRT) display TVs could be as low as approximately 16 ms. By comparison, modern digital TVs using alternative display technologies such as plasma panels, liquid-crystal displays (LCDs), and digital light processing (DLP)/projection displays, for example, may have video latencies as high as approximately 200 ms. In addition, the digital TVs routinely used in place of smart display 204 are typically designed separately from game console 202, adding latency related to their interoperability. In like manner, there can also be additional latency related to the interoperability of joystick 206, for example, and game console 202. Because these multiple sources of latency are effectively cumulative, the effect on the interactive experience of using a modern digital TV as a motion detection feedback display system for inputs provided by joystick 206 may be substantial and undesirable.

In order to reduce video latency, and thereby reduce response latency to acceptable levels, it is necessary that smart display 204 and game console 202 harmonize their interoperability. The present inventive concepts encompass several approaches that, taken individually or in combination, can significantly reduce the video latency of interactive environment 200, within the operating constraints of game console 202 and smart display 204. According to the embodiment of FIG. 2, for example, smart display 204 and game console 202 can be configured to negotiate a reduced video latency by, for example, transferring state information and/or operating parameters over communication link. 228 established between smart display 204 and game console 202. In embodiments in which communication link 228 is a wired link, such as an HDMI connection for example, that wired connection may provide a communication link for transfer of video data as well as state information and/or operating parameters. Alternatively, smart display 204 and game console 202 can be configured to support a wireless communication link, such as through a Bluetooth, Bluetooth LE, WiFi, or other suitable wireless communication protocol, for example. Once a reduced response latency is negotiated, a relatively realistic motion detection feedback may be provided to a user by, for example, smart display 204. It should be noted that in the context, of this invention, video data may comprise visual data and audio data, and in some embodiments may comprise synchronized visual and audio data.

In one exemplary embodiment, smart display 204 can be configured to transfer data corresponding to state information and/or operating parameters to game console 202. Game console 202 can then be configured to utilize the data received from smart display 204 to determine and dynamically adjust a timing and/or format of output data sent to smart display 204 so as to minimize video latency. Alternatively, or in addition, game console 202 may be configured to utilize the data received from smart display 204 to determine and dynamically adjust a display setting format for smart display 204 so as to minimize video latency.

For example, game console 202 can be configured to send smart display 204 progressive content and avoid video latency associated with de-interlacing a video stream, for example. In some embodiments, game console 202 can be configured to identify the native format of smart display 204, using the described communication link, for example, and to send the output video data to smart display 204 in that native format and avoid latency associated with, for example, interpolation and scaling a video stream. In like manner, game console 202 may also be configured to synchronize its output data, such as output video data, to a video frame buffer of smart display 204, thereby avoiding latency associated with asynchronous data transmission.

In some embodiments, game console 202 can be configured to avoid noise filtering and other latency-creating digital signal, processing (DSP) algorithms of smart display 204 by providing output video data in a digital format or by using a video graphics array (VGA) standard, respectively. Similarly, game console 202 may be configured to avoid video latency by determining a display setting format for smart display 204 that deactivates one or more latency-creating DSP algorithms of smart display 204. Then, using communication link 228, game console 202 may place smart display 204 in an operating mode corresponding to the latency-reducing display setting format. Alternatively, in embodiments in which smart display 204 includes a preconfigured low-latency gaming mode, smart display 204 and game console 202 can utilize the described communication link to negotiate use of that existing gaming mode for display of output video data, e.g., gaming video. Thus, embodiments of the present inventive concepts advantageously and automatically provide a more realistic motion detection feedback using smart display 204, and such embodiments may employ any combination of the above methods or any other latency reduction methods enabled through negotiation between game console 202 and smart display 204.

In one embodiment, communication link 228 may comprise an HDMI connection, for example, that may be configured to transfer video data serially, for example, as well as transfer state information and/or operating parameters between game console 202 and smart display 204. Game console 202 may be configured to force smart display 204 to process the video data serially and display each pixel, a line of pixels, or a portion of a frame of pixels immediately as they arrive at smart display 204. Similarly, game console 202 may be configured to transfer output video data serially as each pixel, line of pixels, or portion of a frame of pixels is ready for transmission to smart display 204. By not requiring buffering full frames of video data before transfer or display, for example, the overall video latency may be significantly reduced while allowing some sub-frame processing to take place during a transfer of a full frame of video data, for example. Alternatively, game console 202 may be configured to avoid all sub-frame processing by either or both game console 202 and smart display 204, for example. In any of the above embodiments, transfer of video data over communication link 228 may be frequency and phase locked so as to minimize video latency, thus also minimizing overall response latency.

In addition to the above, or alternatively, data transmissions provided by joystick 206, which may comprise image data, user input data, predictive model parameters, or deviations from a predictive model, for example, can also be synchronized with a video frame buffer of smart display 204, so that when gaming video is rendered on smart display 204, an input stimulus by a user is provided to game console 202 at precisely the right time to minimize response latency due to interoperability between joystick 206, game console 202, and/or smart display 204. Such reduced response latency may be enabled through negotiation between game console 202 and smart display 204, to determine a video frame buffer synchronization, for example, as described above, or, in addition or alternatively, through negotiation between joystick 206 and game console 202 to determine a synchronization to output data of game console 202. By contrast, conventional approaches fail to harmonize the performance of joystick 206, game console 202 and/or smart display 204, relying instead on over-sampled, asynchronous input data transfer, which typically introduces additional latency while over-utilizing communication links such as communication link 208.

Throughout such negotiation, game console 202 may be configured to dynamically adjust response latency according to priorities set by a particular application executed by game console 202, for example, or priorities set by a user in interactive environment 200. Such priorities may include providing high resolution game video to smart display 204 over communication link 228, for example, to the possible detriment of response latency. For instance, in one embodiment, a user or, a game application executed by console 202 may designate that during cut-scene game video, or video that requires little or no motion detection inputs or feedback, console 202 may prioritize video quality and resolution over response latency, for example, and so console 202 may automatically negotiate a response latency configured to allow increased video latency associated with activation of DSP algorithms of smart display 204, for example. Similarly, console 202 may be configured to provide high resolution output video data to smart display 204, for example, even though console 202 may be unable, in some circumstances, to reliably synchronize such output data to a frame buffer of smart display 204 while at such high resolution. Conversely, console 202 may also be configured to reduce game video resolution in order to reliably synchronize such output data to a frame buffer of smart display 204, thereby prioritizing reduction of response latency. By being able to dynamically adjust response latency in such a manner, as well as to automatically reduce response latency generally, as described above, embodiments of the present invention may advantageously provide a reduced response latency while automating an optimal visual experience, thereby providing a more seamless and realistic motion detection feedback experience, using smart display 204, than that capable by conventional interactive environments.

Figure 3:
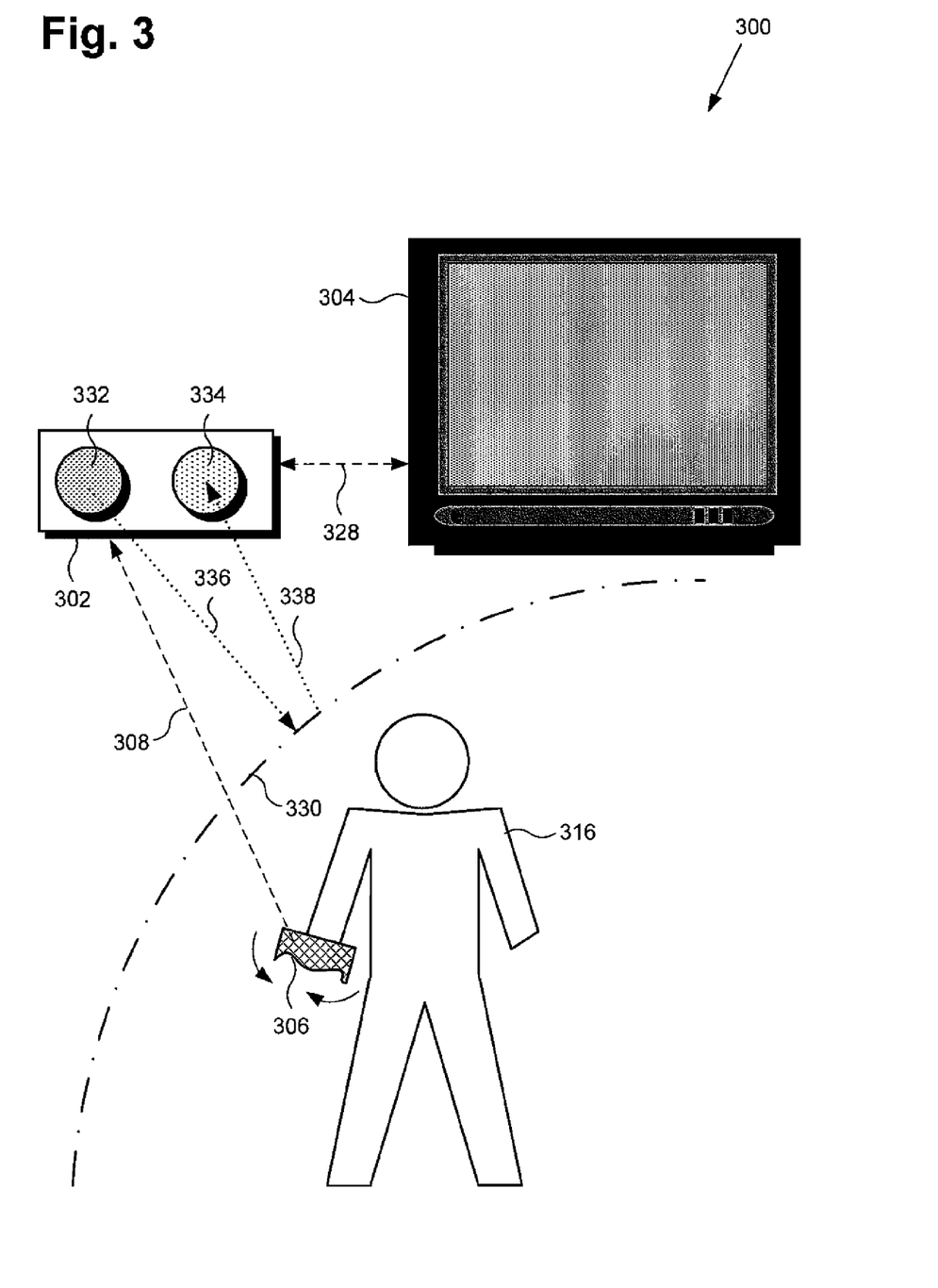
FIG. 3 presents an illustration of a system and method for providing enhanced motion detection according to one embodiment of the present invention.

Turning to FIG. 3, FIG. 3 shows an interactive environment configured for enhanced motion detection, according to one embodiment of the present inventive concepts. Interactive environment 300 includes smart display 304, game console 302, and HID/remote game controller interface 306. As shown in FIG. 3, HID/remote game controller interface 306 is in communication with game console 302 through wireless communication link 308. HID/remote game controller interface 306 can be manipulated by user 316 to provide inputs to, and otherwise interact with a video game executed by game console 302 and presented on smart display 304, for example, using communication link 328. Game console 302, smart display 304, remote game controller interface 306 and communication links 308 and 328 of FIG. 3 correspond respectively to game console 202, smart display 204, joystick 206 and communication links 208 and 228 of FIG. 2; e.g., each corresponding structure may be configured to exhibit the same features and/or operate substantially the same as its counterpart.

As further shown in FIG. 3, game console 302 includes motion detection projector 332 and motion detection camera 334 configured to detect motion within interactive region 330 occupied by user 316. Although not shown in FIG. 3, it is contemplated that game console 302 includes the master game controller for a game played using game console 302. Thus, according to the present embodiment, game console 302 may be configured to host an interactive video game, use motion detection projector 332 to project radiation field 336, such an infrared radiation (IR) or other electromagnetic radiation for example, onto interactive region 330, and to detect scattered radiation field 338 from interactive region 330 using motion detection camera 334. Game console 302 may be further configured to process the data produced by motion detection projector 332 and motion detection camera 334 to detect motion, such as the motion of user 316 and/or remote game controller interface 306 in interactive region 330, and to integrate that motion detection data with output data, such as output video data, for presentation on smart display 304 via communication link 328.

Although the terms "projector" and "camera" typically contemplate optical spectra, it should be understood that in the context of these inventive concepts, a "projector" may be more generally described as a transmitter, and a "camera" may be more generally described as a receiver, of any electromagnetic radiation. For example, motion detection projector 332 may comprise a Bluetooth transmitter, for example, or a 60 GHz transmitter, and motion detection camera 334 may comprise an antenna configured to reliably detect direct or scattered transmission of either radiation field. In other embodiments, however, motion detection projector 332 may comprise a single LED, for example, and motion detector camera may comprise a digital camera, for example, or a low resolution optical sensor.

It is noted that although FIG. 3 depicts the present inventive concepts in terms interactive environment 300, more generally these concepts apply to any interactive system including a control system, such as game console 302, and an interface subsystem, wherein inputs to the control system from the interface subsystem include data corresponding to the movement of a user and/or the movement of an HID, for example, in the possession of the user. Moreover, within the context of an interactive environment, although the embodiment of FIG. 3 shows motion detection projector 332 and motion detection camera 334 as being integrated with game console 302, in other embodiments, one or both of motion detection projector 332 and camera 334 may be physically separate devices suitably positioned for motion detection within interactive region 330. In those latter embodiments, motion detection projector 332 and/or motion detection camera 334 can be coupled to game console 302 through wired or wireless communication links (not shown in FIG. 3). Moreover, in some embodiments, motion detection projector 332 and/or motion detection camera 334, or additional projectors and cameras not shown in FIG. 3, can be integrated with remote game controller interface 306.

A significant advantage of the embodiment shown in FIG. 3 is that it enables detection of gross body movements of user 316 and location detection of remote game controller interface 306 within interactive region 330. Processing of that gross motion and position detection information, and its combination with remote game controller interface input data, such as the spatial orientation of remote game controller interface 306 as a result of positioning by user 316 and/or volitional inputs such as trigger pulls or the like; enable game console 302 to provide user 316 with a highly responsive, accurate and nuanced interactive experience with a game product.

For example, in the embodiment shown in FIG. 3, motion detection projector 332 may project radiation field 336 onto interactive region 330 and produce scattered radiation field 338 resulting from interaction of user 316 and remote game controller interface 306 with radiation field 336. In one embodiment, scattered radiation field 338 may comprise, for example, patterned radiation indicating distances of a large number of scattering surfaces relative to motion detection camera 334, for example, through an intensity distribution or shape of the patterned radiation. Scattered radiation field 338 may be detected by motion detection camera 334, which may provide image data, corresponding to position and/or movement data for user 316 and remote game controller interface 306, for example, to game console 302. In addition, remote game controller interface 306 may sense its own motion using any of the methods described above, for example, and provide such user input data, predictive model parameters, or deviations from a predictive model, for example, to game console 302. Then, game console 302 may integrate all the motion detection data with output video data and provide an accurate and realistic motion detection feedback for user 316 through use of smart display 304.

By being capable of providing motion detection data for user 316, as well as two different types of motion detection data for remote game controller interface 306, embodiments of the present inventive concepts can provide a much more accurate and nuanced interactive experience than that capable with conventional systems. For example, with respect to a video game modeled after tennis, motion detection camera 334 may be configured to provide motion detection data sufficient to detect gross body motion of user 316 and gross relative positioning and motion of remote game controller interface 306 to user 316, while remote game controller interface 306 may provide relatively accurate motion detection data with respect to orientation of remote game controller interface 306. Thus, in that embodiment, the interface subsystem including motion detection projector 332, motion detection camera 334 and remote game controller interface 306 may be configured to provide accurate and realistic motion detection feedback corresponding to player body position, racket position and racket orientation according to output video data displayed on smart display 304.

In another embodiment of the present inventive concepts, an interactive environment such as interactive environment 300 can be configured so as to omit motion detection projector 332. In that embodiment, motion detection camera 334 may be configured to use ambient lighting to detect motion of user 316 and/or remote game controller interface 306. Alternatively, motion detection projector 332 may be integrated with remote game controller interface 306 and comprise, for example, a simple LED light source. In that embodiment, motion detection camera 334 may be configured, as above, to detect a direct or scattered radiation field resulting from interaction of the integrated projector's projected radiation field with interactive region 330, and thereby detect motion of user 316 and/or remote game controller interface 306. Detection of the position and motion of remote game controller interface 306, as captured by motion detection camera 334, for example, combined with specific usage information, such as that remote game controller interface 306 is a hand held device configured for right or left handed users, for example, can enable game console 320 to determine the location and movements of user 316 within interactive region 330.

In another, embodiment, motion detection camera 334 may be integrated with remote game controller interface 306, and perform substantially as described above, but may additionally be configured to accurately sense orientation of remote game controller interface 306 using, for example, scattered radiation field 338. However, in other embodiments, motion detection camera 334, when integrated with remote game controller interface 306, may simply use ambient lighting to detect motion, and so omit use of motion detection projector 332, thereby reducing system complexity and cost. Alternatively, rather than limit the interface subsystem to one motion detection camera, a second motion detection camera may be integrated with remote game controller interface 306, where either or both cameras may be used to provide motion detection data for user 316 and/or remote game controller interface 306, for example, to console 302. Similarly, a second motion detection projector may be included in the interface subsystem, for example, to provide additional information corresponding to position or motion of a user or an HID, for example. Electromagnetic radiation from the projectors may be distinguished from one another using any method for distinguishing multiple electromagnetic signals from one another in a medium, such as time-division multiplexing, frequency-division multiplexing, frequency-modulation, amplitude modulation, and the like. As such, each component in such interface subsystem may be configured to negotiate a synchronous operation mode to enable a particular method for distinguishing signals from the projectors, similar to the process for reducing response latency between a joystick and a game console, as described above. It should be noted that an interface subsystem according to the present inventive concepts may comprise any number of motion detection projectors and motion detection cameras, such as those described above.

As explained more fully above, each component of a motion detection subsystem that provides motion detection data to game console 302, such as motion detection camera 334 and remote game controller interface 306, for example, may use a predictive model to characterize motion of a detected object or person and reduce utilization of communication links, as detailed above. As such, image data from motion detection camera 334, for example, may comprise raw image data, but may also comprise initial movement data, predictive model parameters or deviations from a predictive model, similar to the motion detection data provided by computer mouse 106 of FIG. 1, as explained above.

The combination of gross body position and motion information for a user, such as user 316, with remote game controller interface input data, such as the spatial orientation of remote game controller interface 306 and/or volitional inputs such as trigger pulls or the like, enables consoles according to the present invention concepts, such as game console 302, to provide users with a highly nuanced interactive experience with video games or other applications benefiting from such enhanced motion detection. In addition, by also reducing response latency with respect to an interface subsystem, console and smart display, using the methods described above, for example, embodiments of the present inventive concepts provide users with a highly realistic and responsive interactive experience. Likewise, by additionally providing such enhanced motion detection data as deviations from a predictive model, as described above, each component of a constituent interface subsystem according to the present inventive concepts may benefit from reduced power usage, thereby providing users of motion detection applications long lasting and seamless interactive experiences.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. An electronic system comprising:
   an interface subsystem including a human interface device (HID); and
   a console having a processor configured to:
      form a communication link with the interface subsystem; and
      provide motion detection feedback to a user, wherein
   the HID is configured to:
      generate a predictive model used to predict subsequent motion of the HID,
      transmit the predictive model to the console,
      sense subsequent motion of the HID, and
      generate a modified predictive model, and transmit the modified predictive model to the console, only when the subsequent motion of the HID deviates from the predictive model, and
   the console is configured to utilize a most recent predictive model received from the HID to provide motion detection feedback to the user.

2. The electronic system of claim 1, wherein the communication link with the interface subsystem is a wireless communication link with the HID.

3. The electronic system of claim 1, wherein utilization of the predictive model by the console reduces utilization of the communication link between the console and the interface subsystem.

4. The electronic system of claim 1, wherein
the HID is further configured to transmit, in a transmission separate from any predictive model, deviations from the predictive model to the console; and
the processor of the console is further configured to utilize the predictive model and the deviations to provide the motion detection feedback to the user.

5. The electronic system of claim 1, wherein
the interface subsystem further comprises a camera; and
the processor is further configured to use image data from the camera to sense motion of the user of the HID.

6. The electronic system of claim 5, wherein
the interface subsystem further includes a projector to provide a radiation field for detection by the camera, and
the processor is further configured to use data from the projector.

7. The electronic system of claim 5, wherein
the data from the camera is integrated with data from the HID, and
the HID configured to sense motion of the HID using the camera and to utilize the predictive model to characterize the motion of the HID.

8. The electronic system of claim 1, further comprising:
a smart display, wherein
the console is configured to form a communication link with the smart display and to negotiate a reduced response latency with the smart display.

9. The electronic system of claim 8, wherein the console negotiates the reduced response latency by determining an output data format for the console and a display setting format for the smart display configured to produce the reduced response latency.

10. The electronic system of claim 8, wherein the console negotiates the reduced response latency by synchronizing an output data of the console with a video frame buffer of the smart display.

11. The electronic system of claim 8, wherein the console negotiates the reduced response latency by synchronizing a data transmission by the interface subsystem with an output data of the console.

12. The electronic system of claim 8, wherein the console negotiates the reduced response latency by synchronizing a data transmission by the HID and an output data of the console with a video frame buffer of the smart display.

13. The electronic system of claim 1, wherein
the interface subsystem further comprises a camera; and
the processor further configured to:
   use image data from the camera to sense motion of the user of the HID; and
   negotiate a reduced response latency with the smart display.

14. The electronic system according to claim 1, wherein the HID does not communicate with the console when subsequent motion of the HID corresponds to the most recent predictive motion transmitted to the console.

15. The electronic system according to claim 1, wherein
the HID is an input device, and
the console is configured to utilize the most recent predictive model received from the HID to compensate for signal loss from the HID.

16. A method for execution by an electronic system for providing enhanced motion detection, the method comprising:
   sensing motion of a human interface device (HID);
   formulating, by the HID, a predictive model used to predict subsequent motion of the HID;
   transmitting the predictive model to a console;
   sensing, by the HID, a subsequent motion of the HID;
   determining, by the HID, only when the subsequent motion of the HID deviates from the predictive model;
   generating, by the HID, a modified predictive model when the subsequent motion of the HID deviates from the predictive model;
   transmitting the modified predictive model to the console; and
   utilizing, by the console, a most recent predictive model received from the HID to provide motion detection feedback to a user of the HID.

17. The method of claim 16, wherein in the sensing of the motion by the HID, the HID utilizes data from a camera integrated with data from the HID.

18. The method of claim 16, wherein the sensing motion of the HID is performed by using a camera.

19. The method of claim 16, further comprising negotiating, by the console, a reduced response latency with a smart display.

20. An input device that provides enhanced motion detection to a console in an electronic system, the input device comprising:
   circuitry configured to
      sense motion of the input device;
      generate a predictive model used to predict subsequent motion of the input device;
      transmit the predictive model to the console;
      sense subsequent motion of the input device;
      generate a modified predictive model; and
      transmit the modified predictive model to the console only when the subsequent motion of the input device deviates from the predictive model.

21. The input device according to claim 20, wherein the circuitry does not communicate with the console when subsequent motion of the input device corresponds to a most recent predictive motion transmitted to the console.

22. The input device according to claim 20, wherein the circuitry is configured to wirelessly transmit to the console.

23. The input device according to claim 20, wherein the circuitry is further configured to
   detect deviations in the motion of the input device from the predictive model, and
   transmit, in a transmission separate from any predictive model, the deviations from the predictive model to the console.

24. The input device according to claim 20, wherein
the input device further comprises a camera, and
the circuitry is configured to sense motion of the input device according to image data captured by the camera.

* * * * *